July 17, 1934. G. H. BUCHANAN ET AL 1,967,051
PROCESS OF RECOVERING HYDROCYANIC ACID
Filed March 25, 1924
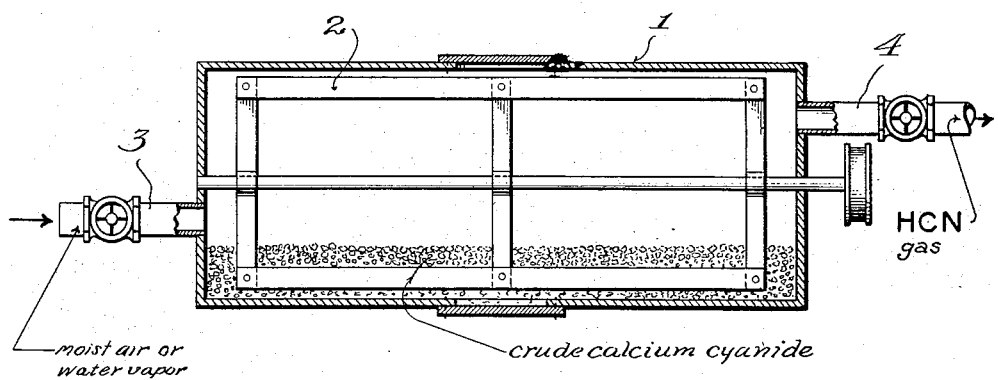
Inventors
G. H. Buchanan
G. B. Winner Patented July 17, 1934

1,967,051

UNITED STATES PATENT OFFICE 1,967,051

PROCESS OF RECOVERING HYDROCYANIC ACID

Guy H. Buchanan, Westfield, and Glenn B. Winner, Elizabeth, N. J., assignors to American Cyanamid Company, New York, N. Y., a corporation of Maine Application March 25, 1924, Serial No. 701,741

1 Claim. (Cl. 23—151)

This invention relates to a process of producing hydrocyanic acid from alkaline earth metal cyanides and particularly from crude calcium cyanides, and has for its object to provide a procedure which will be an improvement over those heretofore proposed.

With these and other objects in view, the invention consists in the novel steps and combinations of steps constituting the process, all as will be more fully hereinafter disclosed and particularly pointed out in the claims.

The accompanying drawing forming a part of this specification is a diagrammatic sectional view illustrating one form of an apparatus suitable for carrying out this invention.

In order that this invention may be more clearly understood it is said: In the production of hydrocyanic acid from alkali metal cyanides or alkaline earth metal cyanides, it has been customary to treat the cyanide with a solution of an acid and by this means liberate hydrocyanic acid which may then be boiled off the mixture and recovered.

In this invention, on the other hand, we have discovered that if an alkaline earth metal cyanide or one produced from lime nitrogen is subjected to the action of water vapor, the said cyanide is decomposed and its cyanide content is liberated as hydrocyanic acid, which may be recovered with yields that are in excess of 90%.

It is well known in the art that alkali metal cyanides are relatively unstable when exposed to the air. That is to say, if sodium cyanide for example be exposed to the air under ordinary atmospheric conditions, hydrocyanic acid is evolved in greater or less quantity and the same may be detected by its odor. The same phenomenon is observed if the cyanide product produced from calcium cyanamid, claimed by W. S. Landis in U. S. Patent No. 1,359,257, be exposed to the air, but in this case we have found the evolution of hydrocyanic acid to be much more rapid than when the alkali cyanides are exposed. The process of Landis consists essentially in providing a mixture of crude calcium cyanamid or lime nitrogen, with a small amount of calcium carbide and sodium chloride, heating the same to about 1300° C. to fuse the mixture and rapidly cooling the cyanide thus formed to below 400° C. The resulting mass contains a large amount of the cyanides and chlorides of sodium and calcium.

It is frequently noted in the literature that the decomposition of alkali metal cyanides in contact with the air is due to the combined action of carbon dioxide gas and the moisture normally present in the air. We have investigated this property of alkali metal cyanides and have in fact found it to be true. That is to say: (1) When we passed air containing $CO_2$ and moisture over particles of sodium cyanide, for example, we found that hydrocyanic acid was in fact evolved, and at a constant rate. (2) When, however, we passed moist air from which the $CO_2$ had been removed, we found that hydrocyanic acid was at first evolved; and by continuing the experiment we learned, that the rate of evolution kept on decreasing and finally ceased. That is, when moist air containing no $CO_2$ is passed over sodium cyanide, hydrocyanic acid is at first evolved, but then after a time ceases. (3) When we passed dry air which contained $CO_2$ over a perfectly dry sample of sodium cyanide, no hydrocyanic acid was evolved.

We thus established the fact that the reaction whereby sodium cyanide continuously evolves hydrocyanic acid on exposure to the air is not a hydrolysis but is an interaction between sodium cyanide and carbonic acid which may be expressed by the following equation:

$$2NaCN + H_2CO_3 = Na_2CO_3 + 2HCN$$

The fact that sodium cyanide on exposure to moist air, containing no $CO_2$ gives off hydrocyanic acid at first may be explained as follows:

Hydrocyanic acid is a very weak acid and its salts such as sodium cyanide are decomposed by water as follows:

$$NaCN + H_2O = NaOH + HCN$$

Therefore, when sodium cyanide is exposed to moist air free of $CO_2$, the above dissociation takes place and hydrocyanic acid escapes until a sufficient excess of the base NaOH has accumulated to prevent further hydrolysis. When this point is reached no more hydrocyanic acid will be evolved by moist air that is free of $CO_2$.

On the other hand, when we passed moist air over the crude cyanide disclosed in the abovementioned patent to Landis, we discovered that $CO_2$ was not an essential constituent of the moist air in order to bring about the continued evolution of hydrocyanic acid from this cyanide material. In fact, we discovered that by passing moist air free from $CO_2$ over this said crude alkaline earth metal cyanide, we could liberate and recover as hydrocyanic acid substantially in excess of 90% of the cyanide content of said crude calcium cyanide.

Were one to attempt to produce hydrocyanic acid by passing moist air over an alkali metal cyanide, the process would be inoperable, because air normally contains such low concentrations of $CO_2$ that the time required to evolve a major portion of the hydrocyanic acid from the cyanide would be too large.

On the other hand, we have discovered and herein disclose a process whereby moist air with or without $CO_2$ can be passed over an alkaline earth metal cyanide, and more particularly over the above-mentioned crude alkaline earth metal cyanide produced by Landis, whereby we recover in excess of 90% of the cyanide content of said crude cyanide, in the form of hydrocyanic acid, HCN.

In carrying out the present process, we proceed in the following manner, reference being had to the above-mentioned accompanying drawing.

Referring to the accompanying drawing, 1 indicates a suitable generating vessel into which we introduce an amount of the said crude cyanide sufficient to cover the bottom of the generator to the depth of say 3 inches. We prefer to grind the said crude cyanide until substantially all of it will pass through a screen containing 40 meshes per inch before introducing it into the generating vessel. We now close the generating vessel and cause the stirring device 2 to revolve. Through the supply pipe 3 we introduce a stream of moist air into the generator. The introduction of the moist air is accompanied by the evolution of a considerable quantity of hydrocyanic acid which passes out through pipe 4 to the recovery apparatus, not shown. The hydrocyanic acid produced may be used as such in the gaseous form for the purpose of fumigation, or it may be condensed to form liquid hydrocyanic acid when steam is the source of water vapor used, as in the variation of our process to be described hereinafter, or it may be absorbed in alkaline reagents such as sodium hydroxide to produce solutions of pure cyanides.

When the process is carried out at temperatures between say 5° C. and 100° C., we have found that air which has a relative humidity as low as 25% may be used, but in order to secure high yields, we prefer to use air which has a relative humidity between 50% and 100%.

When the process is carried out at elevated temperatures, say above 100° C., we have found it operable at all temperatures below which hydrocyanic acid is not decomposed. When working at elevated temperatures, we prefer, however, not to exceed 350° C.

It is obvious that water vapor is the important constituent of the moist air we use, and that consequently the process may be operated by using water vapor which is not mixed with other gases. Thus in working above 100° C., we prefer to use steam alone instead of moist air, for in this way we are enabled to introduce into the generator a gas consisting entirely of water instead of one containing a large proportion of inert gases. When operating under these conditions we also prefer to maintain the temperature of the generator and its contents at a temperature such that no condensation of moisture will take place within the generator. To accomplish this, it is of course, only necessary that the temperature of the generator be maintained slightly above the temperature at which water would boil under the conditions of pressure obtaining in the generator, say at 101° C., when the pressure is atmospheric.

By employing pressures lower than atmospheric, it is obvious that aqueous vapor containing no inert gases may be employed at temperatures lower than 100° C. This is accomplished by reducing the pressure to the point at which water boils at the temperature desired. Thus, if we should desire to use pure water vapor at 40° C., we would operate the process under a pressure of substantially 88 mm. of mercury, the pressure at which water boils at 40° C.

Some of the advantages of our new process over the prior art reside in—

(a) The process utilizes a cheap and easily obtainable reagent, i. e., water in the form of vapor.

(b) It permits the production of hydrocyanic acid in places where acids for producing the same are not available.

(c) The residues from the process are solids and are not acidic as are those from the prior processes which use an acid, consequently they present no disposal problem.

It is now obvious that we have disclosed a process whereby one may pass water vapor over a crude alkaline earth metal cyanide, such as is produced from calcium cyanamid, and thereby recover hydrocyanic acid from the said crude alkaline earth metal cyanide. Although we have specified moist air, the relative humidity of which is greater than 25%, it is obvious that water vapor and not the other constituents are responsible for the results which we secure, although in some cases it is very convenient to use air as a carrier for said water vapor. Consequently, water vapor alone or any mixture of gases containing water vapor may be used, providing the gases other than water vapor do not react with the crude cyanide to produce undesirable products. Thus the term "25% relative humidity" would mean that the water vapor at the temperature at which it was used had a pressure which was 25% of that pressure which water vapor has in contact with water at said temperature. Or, stated in other words, it means that there is present in the air, 25% of the maximum amount of water vapor said air is capable of containing at said temperature.

What is claimed is:—

The process of producing hydrocyanic acid from a crude cyanide compound containing a cyanide which is unstable in aqueous solution which consists in reacting upon said crude cyanide compound with water vapor under pressures less than atmospheric; and recovering hydrocyanic acid.

GUY H. BUCHANAN.
GLENN B. WINNER.